US010437857B2

(12) United States Patent
Inoue et al.

(10) Patent No.: US 10,437,857 B2
(45) Date of Patent: Oct. 8, 2019

(54) MAPPING DEVICE, MAPPING METHOD, AND RECORDING MEDIUM

(71) Applicant: FUJITSU LIMITED, Kawasaki-shi, Kanagawa (JP)

(72) Inventors: Takayuki Inoue, Kawasaki (JP); Suguru Washio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1063 days.

(21) Appl. No.: 14/592,229

(22) Filed: Jan. 8, 2015

(65) Prior Publication Data
US 2015/0127689 A1 May 7, 2015

Related U.S. Application Data

(63) Continuation of application No. PCT/JP2012/067614, filed on Jul. 10, 2012.

(51) Int. Cl.
*G06F 16/21* (2019.01)
*G06F 16/28* (2019.01)
(Continued)

(52) U.S. Cl.
CPC .......... *G06F 16/282* (2019.01); *G06F 16/211* (2019.01); *G06F 17/227* (2013.01); *G06F 17/2247* (2013.01); *G06Q 10/10* (2013.01)

(58) Field of Classification Search
USPC ................................................ 707/778, 797
See application file for complete search history.

(56) References Cited

U.S. PATENT DOCUMENTS

| 5,960,173 | A  | * | 9/1999 | Tang ......................... G06F 9/54 348/14.08 |
| 6,519,557 | B1 | * | 2/2003 | Emens ................. G06F 17/2211 704/5 |

(Continued)

FOREIGN PATENT DOCUMENTS

| JP | 2003-242167 | 8/2003 |
| JP | 2004-348341 | 12/2004 |

(Continued)

OTHER PUBLICATIONS

Tahara et al., "Recovering Traceability Links Between a Specification Document and a Source Code Using Their Structural Similarities", *IPSJ SIG Technical Report*, Mar. 18, 2008, pp. 139-146.

(Continued)

*Primary Examiner* — Cheyne D Ly
(74) *Attorney, Agent, or Firm* — Staas & Halsey LLP

(57) ABSTRACT

A non-transitory computer-readable recording medium has stored therein a mapping program that causes a computer to execute a process. The process includes: first calculating a matching rate between top-level parent items in a hierarchical relationship between a first plurality of items of a first data and a second plurality of items of a second data based on an item information relating to the first plurality of items and the second plurality of items, the first data including one or a plurality of items before a change, the second data including one or a plurality of items after the change; and associating the parent items of the first data and the second data with each other based on the calculated matching rate.

7 Claims, 12 Drawing Sheets

(51) Int. Cl.
*G06F 17/22* (2006.01)
*G06Q 10/10* (2012.01)

(56) References Cited

U.S. PATENT DOCUMENTS

| | | | | |
|---|---|---|---|---|
| 8,176,003 | B2* | 5/2012 | Bush | G06F 17/2247 707/602 |
| 8,423,586 | B2* | 4/2013 | Binstock | G06F 17/30592 707/803 |
| 2005/0223325 | A1* | 10/2005 | Naitou | G06F 17/2247 715/255 |
| 2005/0234856 | A1* | 10/2005 | Baumhof | G06F 17/2247 |
| 2006/0041579 | A1 | 2/2006 | Miyashita et al. | |
| 2007/0150495 | A1 | 6/2007 | Koizumi et al. | |
| 2008/0294614 | A1 | 11/2008 | Miyashita et al. | |
| 2009/0030754 | A1* | 1/2009 | McNamar | G06F 19/3487 705/7.11 |
| 2010/0100807 | A1 | 4/2010 | Matsumoto et al. | |
| 2012/0278694 | A1 | 11/2012 | Washio | |

FOREIGN PATENT DOCUMENTS

| | | |
|---|---|---|
| JP | 2006-24179 | 1/2006 |
| JP | 2007-179146 | 7/2007 |
| JP | 2008-97215 | 4/2008 |
| WO | WO 2011/089683 A1 | 7/2011 |

OTHER PUBLICATIONS

International Search Report dated Aug. 21, 2012, in corresponding International Patent Application No. PCT/JP2012/067614.
Japanese Office Action dated Dec. 8, 2015 in corresponding Japanese Patent Application No. 2014-524524.
Japanese Office Action dated Aug. 9, 2016 in corresponding Japanese Patent Application No. 2014-524524.

* cited by examiner

FIG.6

[COMPARISON-SOURCE TREE STRUCTURE]
+ASSETS                                              : ITEM NAME
 -ASSETS                                             : LABEL INFORMATION
 -REGULATION OF FINANCIAL STATEMENTS, FORM A         : AUXILIARY INFORMATION
 -CHILD×3                                            : NUMBER OF CHILD ITEMS

[COMPARISON-DESTINATION TREE STRUCTURE]
CANDIDATE 1:
+ASSET                                               : ITEM NAME
 -ASSETS                                             : LABEL INFORMATION
 -REGULATION OF FINANCIAL STATEMENTS, FORM A         : AUXILIARY INFORMATION
 -CHILD×3                                            : NUMBER OF CHILD ITEMS
CANDIDATE 2:
+COSTS                                               : ITEM NAME
 -ASSETS                                             : LABEL INFORMATION
 -REGULATION OF FINANCIAL STATEMENTS, FORM B         : AUXILIARY INFORMATION
 -CHILD×4                                            : NUMBER OF CHILD ITEMS
CANDIDATE 3:
+INCOME                                              : ITEM NAME
 -ASSETS                                             : LABEL INFORMATION
REGULATION OF FINANCIAL STATEMENTS, FORM C           : AUXILIARY INFORMATION
 -CHILD×5                                            : NUMBER OF CHILD ITEMS

FIG.7

[COMPARISON-SOURCE ITEM]
+ASSETS                                                    : PARENT ITEM
 -CURRENT ASSETS                                           : ITEM NAME
  -CURRENT ASSETS                                          : LABEL INFORMATION
  -REGULATION OF FINANCIAL STATEMENTS, FORM B              : REFERENCE INFORMATION
  -1                                                       : ORDER INFORMATION
 -DEFERRD ASSETS                                           : ITEM NAME
  -DEFERRED ASSETS                                         : LABEL INFORMATION
  -REGULATION OF FINANCIAL STATEMENTS, FORM B              : REFERENCE INFORMATION
  -2                                                       : ORDER INFORMATION
 -NON CURRENT ASSETS                                       : ITEM NAME
  -FIXED ASSETS                                            : LABEL INFORMATION
  -REGULATION OF FINANCIAL STATEMENTS, FORM B              : REFERENCE INFORMATION
  -3                                                       : ORDER INFORMATION

[COMPARISON-DESTINATION ITEM]
+ASSETS                                                    : PARENT ITEM
 -CURRENT ASSET                                            : ITEM NAME
  -CURRENT ASSETS                                          : LABEL INFORMATION
  -REGULATION OF FINANCIAL STATEMENTS, FORM B              : REFERENCE INFORMATION
  -1                                                       : ORDER INFORMATION
 -NON CURRENT ASSET                                        : ITEM NAME
  -FIXED ASSETS                                            : LABEL INFORMATION
  -REGULATION OF FINANCIAL STATEMENTS, FORM B              : REFERENCE INFORMATION
  -2                                                       : ORDER INFORMATION
 -DEFERRD ASSET                                            : ITEM NAME
  -DEFERRED ASSETS                                         : LABEL INFORMATION
  -REGULATION OF FINANCIAL STATEMENTS, FORM B              : REFERENCE INFORMATION
  -3                                                       : ORDER INFORMATION

FIG.9A

[COMPARISON-SOURCE ITEM]
1. +ASSETS : PARENT ITEM
2. -CURRENT ASSETS : ITEM NAME
    -1 : ORDER INFORMATION
3. -NON CURRENT ASSETS : ITEM NAME
    -2 : ORDER INFORMATION
4. -DEFERRED ASSETS : ITEM NAME
    -3 : ORDER INFORMATION

[COMPARISON-DESTINATION ITEM]
1'. +ASSETS : PARENT ITEM
2'. -CURRENT ASSET : ITEM NAME
    -1 : ORDER INFORMATION
3'. -NON CURRENT ASSET : ITEM NAME
    -2 : ORDER INFORMATION
4'. -DEFERRED ASSET : ITEM NAME
    -3 : ORDER INFORMATION

FIG.9B

| COMBINATION OF CURRENT ASSETS | | COMBINATION OF NON CURRENT ASSETS | | COMBINATION OF DEFERRD ASSETS | | ENTIRE MATCHING RATE | |
|---|---|---|---|---|---|---|---|
| 2-2' | 92.30% | 3-3' | 93.80% | 4-4' | 92.30% | 92.80% | ←p1 |
|  |  | 3-4' | 37.50% | 4-3' | 37.50% | 55.80% | ←p2 |
| 2-3' | 69.20% | 3-2' | 75.00% | 4-4' | 92.30% | 78.80% | ←p3 |
|  |  | 3-4' | 37.50% | 4-2' | 38.50% | 48.40% | ←p4 |
| 2-4' | 38.50% | 3-2' | 75.00% | 4-3' | 37.50% | 50.30% | ←p5 |
|  |  | 3-3' | 93.8% | 4-2' | 38.50% | 56.90% | ←p6 |

FIG.15

[BEFORE CHANGE]
+ASSETS : PARENT ITEM AS TARGET FOR COMPARISON
 -CURRENT ASSETS : ITEM AS TARGET FOR COMPARISON
 -NON CURRENT ASSETS : SIBLING ITEM AS TARGET FOR COMPARISON

[AFTER CHANGE]
+ASSETS : PARENT ITEM AS TARGET FOR COMPARISON
 -CURRENT ASSET : ITEM AS TARGET FOR COMPARISON
 -NON CURRENT ASSETS : SIBLING ITEM AS TARGET FOR COMPARISON

FIG.16

[BEFORE CHANGE]
+GROSS PROFIT : PARENT ITEM
 -CURRENT ASSETS : CHILD ITEM 1 (ITEM AS TARGET FOR COMPARISON)
  -CURRENT ASSETS : LABEL INFORMATION (AUXILIARY INFORMATION)
  -1 : ORDER INFORMATION (AUXILIARY INFORMATION)
 -CURRENT COSTS : CHILD ITEM 2 (SIBLING ITEM)
  -2 : ORDER INFORMATION (AUXILIARY INFORMATION)

[AFTER CHANGE]
+GROSS PROFIT : PARENT ITEM
 -CURRENT RESOURCES : CHILD ITEM 1 (ITEM AS TARGET FOR COMPARISON)
  -CURENT ASSETS : LABEL INFORMATION (AUXILIARY INFORMATION)
  -1 : ORDER INFORMATION (AUXILIARY INFORMATION)
 -CURRENT PRICES : CHILD ITEM 2 (SIBLING ITEM)
  -2 : ORDER INFORMATION (AUXILIARY INFORMATION)

MAPPING DEVICE, MAPPING METHOD, AND RECORDING MEDIUM

CROSS-REFERENCE TO RELATED APPLICATION

This application is a continuation application of International Application No. PCT/JP2012/067614 filed on Jul. 10, 2012, and designating the U.S., the entire contents of which are incorporated herein by reference.

FIELD

The embodiments discussed herein are related to a program, a mapping device, and a mapping method.

BACKGROUND

Financial statements using an XBRL (extensible Business Reporting Language) document are requested to be submitted to Financial Services Agency. The XBRL document is a document described in XBRL which is an XML (extensible Markup Language)-based report description language related to, for example, financial reporting.

XBRL data used to create the XBRL document is changed according to, for example, amendment of laws, changes in accounting standards, and changes in the policy of the financial reporting of a supervisory organization of companies. The XBRL data includes a schema and a linkbase. The schema is a list of items used for the XBRL data, and defines a name and a data type of each item. The linkbase defines a relationship between items included in the schema. For example, the linkbase defines a relationship of a tree structure in which a plurality of child items hang from a parent item. Moreover, the linkbase defines order information as auxiliary information of a child item, so that a display order of the child item is determined by the order information. Items before and after a change are associated with each other using the XBRL data.

FIG. 15 is a diagram of an example in which items before and after a change are associated with each other using the XBRL data. FIG. 15 depicts XBRL data before the change and after the change. When an item name "CurrentAssets" in the XBRL data before the change is changed to an item name "CurrentAsset" in the XBRL data after the change, a mapping device that maps the items before and after the change focuses on a parent-child relationship, a sibling relationship, or auxiliary information between two items before and after the change. In FIG. 15, the mapping device compares parent items or sibling items in the items as targets for comparison, and determines that the item names of the parent items are the same "Assets" and the item names of the sibling items are also the same "NonCurrentAssets". The mapping device produces a result that the item name "CurrentAssets" as the target for comparison has been changed to the item name "CurrentAsset" as the target for comparison, and associates the items before and after the change with each other (see, for example, Patent Document 1).

Patent Document 1: International Publication Pamphlet No. WO 2011/089683

However, there is a problem that when a plurality of pieces of information related to items in the XBRL data are changed, it is difficult to optimally associate the items before and after the change with each other. For example, when the item name of an item in the XBRL data is changed and the auxiliary information of the changed item is also changed, it is difficult to optimally associate the items before and after the change with each other.

FIG. 16 is a diagram of an example in which it is difficult to optimally associate items before and after the change with each other. FIG. 16 depicts the XBRL data before and after the change. When the item name "CurrentAssets" in the XBRL data before the change is changed to an item name "CurrentResources" in the XBRL data after the change, the mapping device focuses on a parent-child relationship, a sibling relationship, or pieces of auxiliary information between the two items before and after the change. In FIG. 16, the mapping device respectively compares parent items and sibling items of the items as targets for comparison with each other, and also compares pieces of label information as auxiliary information of the items with each other. The mapping device then determines that the item names of the parent items are the same as each other. However, the item names of the sibling items are "CurrentCosts" and "CurrentPrices", which are not the same as each other. Moreover, both pieces of the label information are "Current Assets" and "Curent Assets", that is, not all parts of both information match each other. Therefore, it is difficult for the mapping device to reliably produce a result such that the item name "CurrentAssets" as the target for comparison is changed to the item name "CurrentResources" as the target for comparison. Accordingly, it is difficult for the mapping device to optimally associate the items before and after the change with each other.

SUMMARY

According to an aspect of the embodiments, a non-transitory computer-readable recording medium has stored therein a mapping program that causes a computer to execute a process. The process includes: first calculating a matching rate between top-level parent items in a hierarchical relationship between a first plurality of items of a first data and a second plurality of items of a second data based on an item information relating to the first plurality of items and the second plurality of items, the first data including one or a plurality of items before a change, the second data including one or a plurality of items after the change; and associating the parent items of the first data and the second data with each other based on the calculated matching rate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram of an example of mapping of tree structures before and after the change;

FIG. 7 is a diagram of an example of tree structures before and after the change;

FIG. 9A is a diagram (1) for explaining a specific example of patterns of combinations between child items before and after the change and of their matching rates;

FIG. 9B is a diagram (2) for explaining a specific example of patterns of combinations between child items before and after the change and of their matching rates;

FIG. 15 is a diagram of an example in which items before and after the change are associated with each other using XBRL data; and FIG. 16 is a diagram of an example in which it is difficult to optimally associate items before and after the change with each other.

DESCRIPTION OF EMBODIMENTS

Preferred embodiments will be explained with reference to accompanying drawings. Note that the invention is not limited to the following embodiments.

Configuration of Mapping Device According to Embodiment

Figure 1:
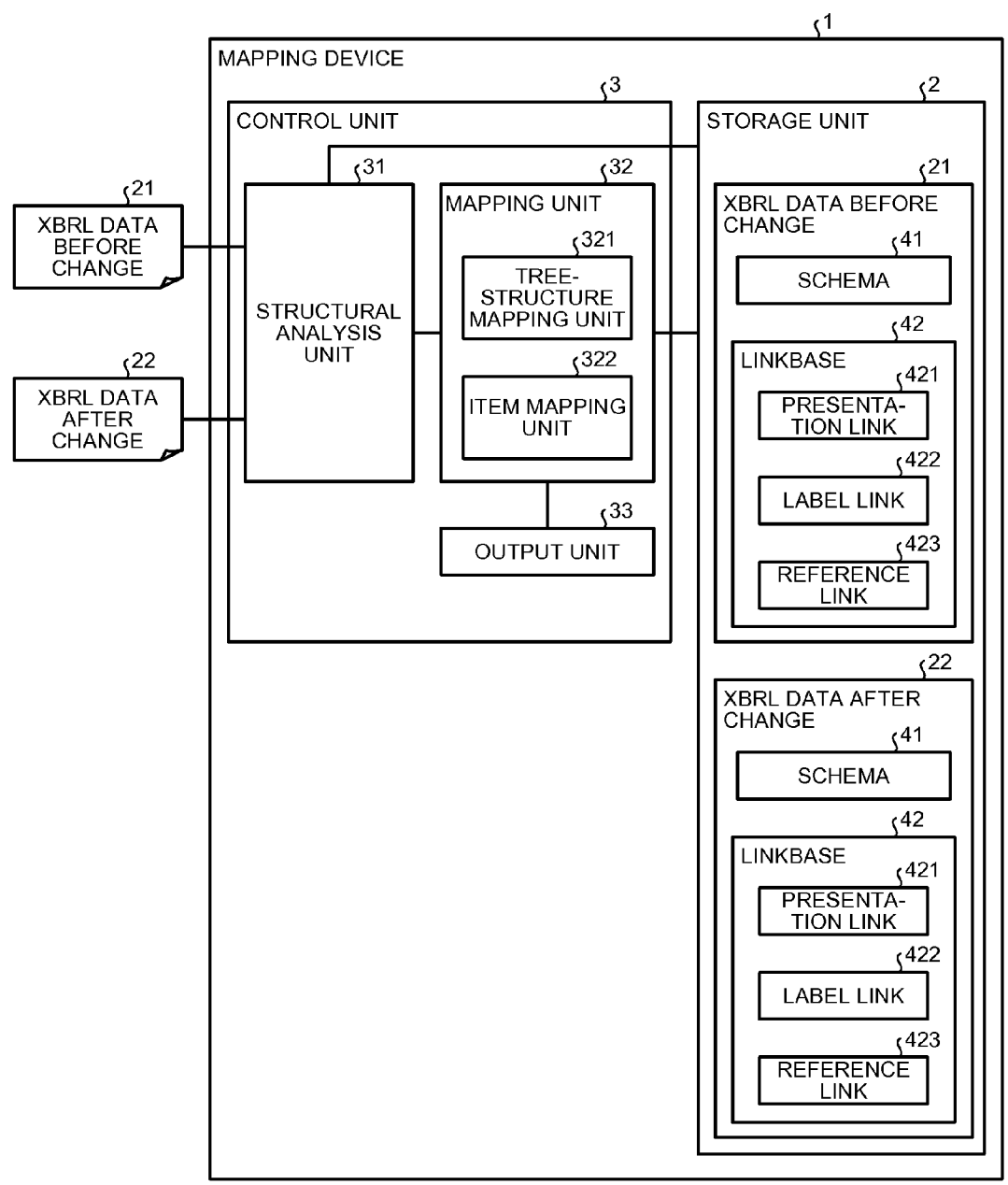
FIG. 1 is a functional block diagram of a configuration of a mapping device according to an embodiment.

FIG. 1 is a functional block diagram of a configuration of a mapping device according to an embodiment. As illustrated in FIG. 1, a mapping device 1 receives XBRL data 21 before a change and XBRL data 22 after the change, and associates items included in the XBRL data 21 and 22 before and after the change with each other.

The XBRL data 21 and 22 before and after the change define respective taxonomies. "Taxonomy" defines a system of items (hereinafter, called "item") used in XBRL, and includes a schema and a linkbase. "Schema" is a list of items and defines a name and a data type of each item. "Linkbase" defines link information for each item, and includes, for example, a presentation link, a label link, and a reference link. "Presentation link" defines a parent-child relationship and a display order (order information) between items, and the like. "Label link" defines a label of an item (e.g., "Assets" as a label of an item name "Assets"). "Reference link" defines document information as grounds for defining the item (e.g., "Regulation of Financial Statements, Form A" as document information of the item name "Assets"). In other words, the mapping device 1 associates items before and after the change with each other even if, for the items included in the XBRL data 21 before the change, an item name is changed, a label name is changed, a document information name is changed, and an order of a child item is changed.

In the embodiment, "schema" corresponds to a schema 41. "Linkbase" corresponds to a linkbase 42. Each configuration example of the schema 41 and the linkbase 42 will be explained later.

The mapping device 1 includes a storage unit 2 and a control unit 3.

The storage unit 2 corresponds to a storage device being a nonvolatile semiconductor memory device or the like such as a flash memory and FRAM (registered trademark) (Ferroelectric Random Access Memory). The storage unit 2 includes the XBRL data 21 before the change and the XBRL data 22 after the change.

The XBRL data 21 before the change and the XBRL data 22 after the change are stored in the storage unit 2 by a structural analysis unit 31 which is explained later. Each of the XBRL data 21 before the change and the XBRL data 22 after the change includes the schema 41 and the linkbase 42. Moreover, the linkbase 42 includes a presentation link 421, a label link 422, and a reference link 423.

Figure 2:
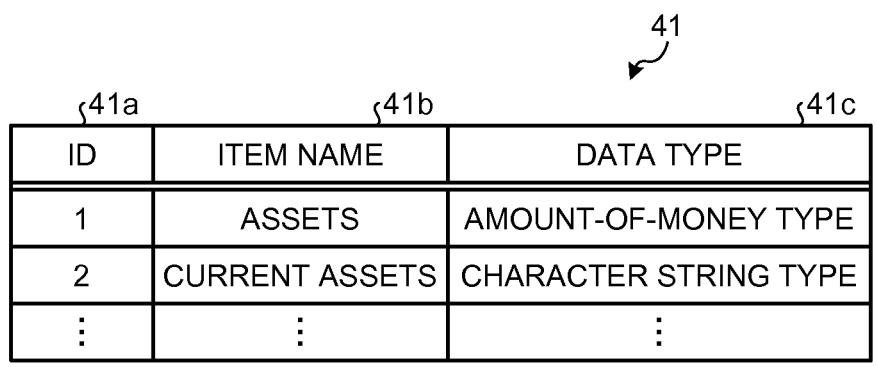
FIG. 2 is a diagram of an example of a data structure of a schema.
Figure 3:
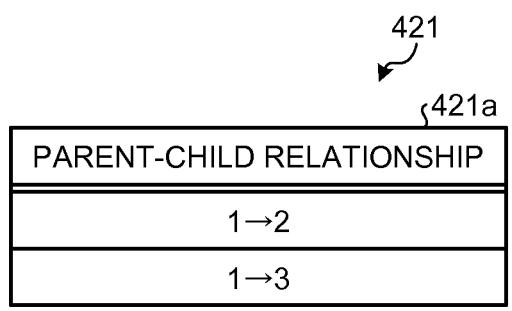
FIG. 3 is a diagram of an example of a data structure of a linkbase (presentation link)
Figure 4:
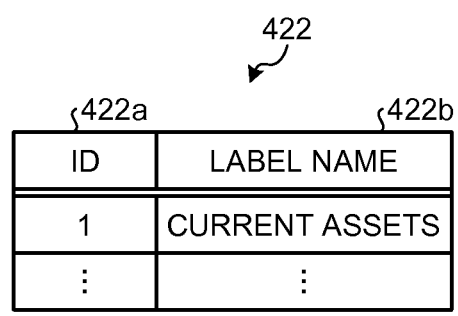
FIG. 4 is a diagram of an example of a data structure of a linkbase (label link)
Figure 5:
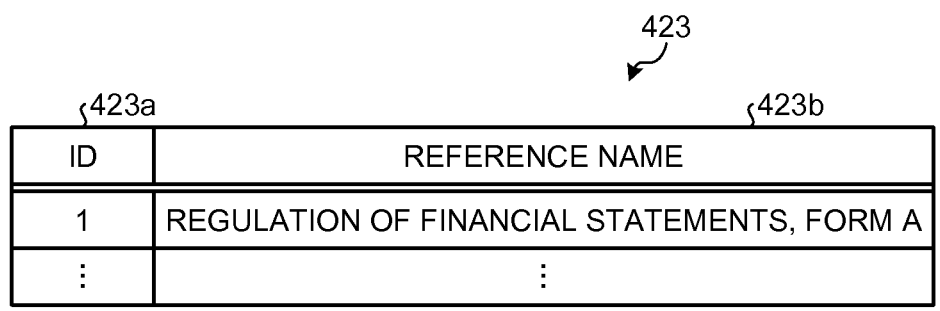
FIG. 5 is a diagram of an example of a data structure of a linkbase (reference link)

Each data structure of the schema 41 and of the presentation link 421, the label link 422, and the reference link 423 included in the linkbase 42 will be explained herein with reference to FIG. 2 to FIG. 5. FIG. 2 is a diagram of an example of the data structure of a schema. FIG. 3 is a diagram of an example of the data structure of a linkbase (presentation link). FIG. 4 is a diagram of an example of the data structure of a linkbase (label link). FIG. 5 is a diagram of an example of the data structure of a linkbase (reference link).

As illustrated in FIG. 2, the schema 41 stores an item name 41b and a data type 41c associated with each other for each ID (IDentification) 41a. The ID 41a is an identifier of an item used in the XBRL data. The item name 41b indicates a name of an item. The data type 41c indicates a data type of a value associated with an item. As one example, when the ID 41a is "1", "Assets" as the item name 41b and "Amount-of-Money Type" as the data type 41c are stored.

As illustrated in FIG. 3, the presentation link 421 stores a parent-child relationship 421a. The parent-child relationship 421a defines a parent-child relationship between items using identifiers of the items and an arrow. In the example of FIG. 3, when an identifier "1" of an item is parent and an identifier "2" of an item is child, the parent-child relationship 421a is expressed by "1→2". When there is a plurality of children with respect to the same parent, and, for example, if a child is in an upper position in the parent-child relationship 421a, a display order (order information) of the child precedes display orders of any other children. In the example of FIG. 3, there are identifiers "2" and "3" of the child items with respect to the identifier "1" of the parent item. In this case, the child with the identifier "2" in the upper part is assigned with order information "1", and the child with the identifier "3" in the lower part is assigned with order information "2". The parent-child relationship 421a is not limited to a relation between a parent and a child, and may be a relation of offspring, or may be a relation from a grandchild to a great-grandchild.

As illustrated in FIG. 4, the label link 422 stores a label name 422b associated with each ID 422a. The ID 422a is an identifier of an item, and corresponds to the ID 41a illustrated in FIG. 2. The label name 422b represents a label of an item. As one example, when the ID 422a is "1", "Current Assets" is stored as the label name 422b.

As illustrated in FIG. 5, the reference link 423 stores a reference name 423b associated with each ID 423a. The ID 423a is an identifier of an item, and corresponds to the ID 41a illustrated in FIG. 2. The reference name 423b indicates document information as grounds for defining the item. As one example, when the ID 423a is "1", "Regulation of Financial Statements, Form A" is stored as the reference name 423b.

The control unit 3 includes an internal memory used to store programs and control data that specify various processing procedures, and thereby performs various processing. The control unit 3 corresponds to an integrated circuit such as ASIC (Application Specific Integrated Circuit) and FPGA (Field Programmable Gate Array), or to an electronic circuit such as CPU (Central Processing Unit) and MPU (Micro Processing Unit). The control unit 3 further includes the structural analysis unit 31, a mapping unit 32, and an output unit 33. Moreover, the mapping unit 32 includes a tree-structure mapping unit 321 and an item mapping unit 322.

The structural analysis unit 31 uses the XBRL data 21 and 22 before and after the change to perform structural analysis and create tree structures before and after the change. For example, the structural analysis unit 31 receives the XBRL data 21 and 22 before and after the change and stores the received XBRL data 21 and 22 before and after the change in the storage unit 2. As one example, the structural analysis unit 31 is implemented by input/output of the XBRL data 21 and 22 before and after the change which are files to/from a storage device. The structural analysis unit 31 creates a tree structure of items described in the schema 41 before the change using a parent-child relationship and a display order represented in the presentation link 421 before the change. Moreover, the structural analysis unit 31 adds a label name represented in the label link 422 and a reference name represented in the reference link 423 to the created tree structure. The structural analysis unit 31 creates a tree structure of items described in the schema 41 after the change using the linkbase 42 after the change.

The mapping unit 32 includes the tree-structure mapping unit 321 and the item mapping unit 322.

The tree-structure mapping unit 321 maps a tree related to the parent item after the change (comparison destination) with respect to a tree related to the parent item before the change (comparison source) based on the tree structures before and after the change created by the structural analysis unit 31. Here, the tree-structure mapping unit 321 maps a comparison-destination tree being closest, in structure, to a comparison-source tree. For example, the tree-structure mapping unit 321 compares item names with each other and compares pieces of auxiliary information with each other between top-level parent items in the comparison-source tree and the comparison-destination tree. The auxiliary information includes, as one example, a label name, a reference name, and the number of child items hanging from a parent item.

Mapping of tree structures before and after the change (comparison source/destination) will be explained herein with reference to FIG. 6. FIG. 6 is a diagram of an example of the mapping of tree structures before and after the change. As illustrated in FIG. 6, there is a tree with "Assets" set as a parent item in the comparison-source tree structure, in which "Assets" is described as label information of the parent item, "Regulation of Financial Statements, Form A" is described as reference information thereof, and "3" is described as the number of child items thereof. In FIG. 6, the label information, the reference information, and the number of child items are auxiliary information. The tree-structure mapping unit 321 compares item names, pieces of label information, pieces of reference information, and the numbers of child items, respectively with each other, between the parent item as the comparison source and each of parent items as candidates for the comparison destination. The tree-structure mapping unit 321 compares herein the item names between the parent item as the comparison source and each of the parent items as candidates for the comparison destination, and determines that Candidate 1 in which a last character "s" is deleted from the item name of the comparison source is similar to that of the comparison source. The tree-structure mapping unit 321 then compares the label information, the reference information, and the number of child items as the candidates for the comparison source and the comparison destination, and determines that Candidate 1 matches the comparison source. Accordingly, the tree-structure mapping unit 321 can map the tree of the parent item "Asset" indicated by comparison-destination Candidate 1 in the tree of the comparison-source parent item "Assets".

Referring back to FIG. 1, the comparison is performed by the tree-structure mapping unit 321, as a specific example, by using a matching rate between item names of the parent items and a matching rate between pieces of auxiliary information of the parent items.

A matching rate between character strings such as an item name, a label name, and a reference name is calculated, as one example, by the following Equation (1).

$$A \text{ matching rate } a_{0,1,2} \text{ of character strings} = \{(\text{Maximum number of characters} - \text{Number of mismatched characters})/\text{Maximum number of characters}\} \times 100(\%) \quad (1)$$

Where $a_0$ is a matching rate between item names, $a_1$ is a matching rate between label names, and $a_2$ is a matching rate between reference names. The maximum number of characters indicates the number of characters larger than the other one between a comparison-source character string and a comparison-destination character string. The number of mismatched characters is calculated, as one example, by using Levenshtein distance; however, the method is not limited thereto if it is a method capable of calculating a similarity of character strings.

A matching rate $a_3$ between the numbers of child items is calculated by the following Equation (2).

$$A \text{ matching rate } a_3 \text{ between the numbers of child items} = \{(\text{Maximum number of items} - \text{Difference between the numbers of items})/\text{Maximum number of items}\} \times 100(\%) \quad (2)$$

The maximum number of items indicates the larger one of the number of child items owned by the comparison-source parent item and of the number of child items owned by the comparison-destination parent item. A difference between the numbers of items indicates an absolute value of a difference between the number of child items owned by the comparison-source parent item and the number of child items owned by the comparison-destination parent item.

The tree-structure mapping unit 321 calculates an average of calculated matching rates to thereby calculate a matching rate between parent items. The matching rate between parent items is calculated by the following Equation (3).

$$A \text{ matching rate } e(\%) \text{ between parent items} = 1/n \sum_{k=0}^{n-1} a \quad (3)$$

Where n expressed in the Equation (3) indicates 4.

The tree-structure mapping unit 321 maps trees of two parent items with a highest matching rate between the parent items, determined as the trees closest to each other in structure. Thereafter, the item mapping unit 322, explained later, maps the child items in these trees.

When the trees of the parent items are mapped, the item mapping unit 322 calculates matching rates between the child items respectively hanging from the mapped parent item of the tree before the change and from the mapped parent item of the tree after the change. For example, the item mapping unit 322 creates a plurality of patterns between the child items included in the respective trees before and after the change. The item mapping unit 322 calculates a matching rate between the child items included in a pattern of each of the created patterns. The matching rate between child items is calculated by using the matching rate between the item names of the child items and the matching rate between the pieces of auxiliary information of the child items. The auxiliary information mentioned here includes, as one example, a label name, a reference name, and order information (display order).

A matching rate between character strings such as an item name, a label name, and a reference name is calculated by the Equation (1) similarly to the matching rate between parent items. A matching rate between pieces of order information is calculated by the following Equation (4).

$$A \text{ matching rate } a_3 \text{ between orders} = \{(\text{Maximum order number} - \text{Difference between order numbers})/\text{Maximum order number}\} \times 100(\%) \quad (4)$$

The maximum order number indicates the larger one of the order number of a comparison-source child item and of the order number of a comparison-destination child item. The difference between the order numbers indicates an absolute value of the difference between the order number of the comparison-source child item and the order number of the comparison-destination child item.

The item mapping unit 322 calculates an average of the calculated matching rates to thereby calculate a matching rate between the child items. The matching rate between child items is calculated by the following Equation (5).

$$A \text{ matching rate } e(\%) \text{ between child items} = 1/n \sum_{k=0}^{n-1} a \quad (5)$$

Where n expressed in the Equation (5) indicates 4, $a_0$ is a matching rate between item names, $a_1$ is a matching rate between label names, $a_2$ is a matching rate between reference names, and $a_3$ is a matching rate between orders.

When a matching rate between child items included in a pattern is calculated, the item mapping unit 322 calculates an average of matching rates between child items included in patterns to thereby calculate a matching rate of the entire tree for each pattern. The matching rate of the entire tree is calculated by the following Equation (6).

$$\text{An entire matching rate } E(\%) = 1/m \sum_{k=0}^{m-1} e_k \quad (6)$$

Where m expressed in the Equation (6) indicates the number of child items included in a pattern, and $e_k$ indicates a matching rate between the child items included in the pattern. If an entire matching rate E is higher, a matching rate between the child items included in the pattern, in which the entire matching rate is calculated, is assumed to be higher.

The item mapping unit 322 maps the child items of the patterns between which the highest matching rate is calculated. This enables the item mapping unit 322 to optimally map items before and after the change even if a plurality of pieces of information, related to items, among the item names and the auxiliary information are changed.

For the parent items mapped by the tree-structure mapping unit 321 and the child items mapped by the item mapping unit 322, the output unit 33 outputs the items whose matching rate is not a perfect match (100%). This enables the output unit 33 to represent a result such that items before and after the change are optimally mapped even if pieces of information among item names and auxiliary information related to the items are changed.

Mapping of Child Items Before and after Change

Figure 8A:
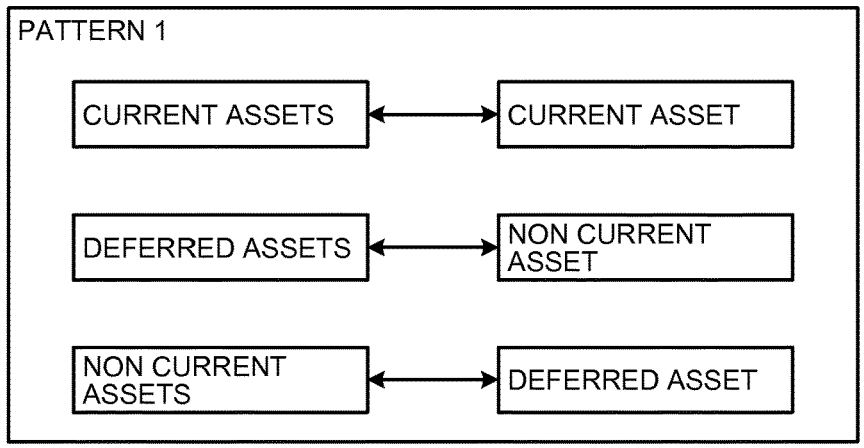
FIG. 8A is a diagram (1) of a pattern example of combinations between child items before and after the change.
Figure 8B:
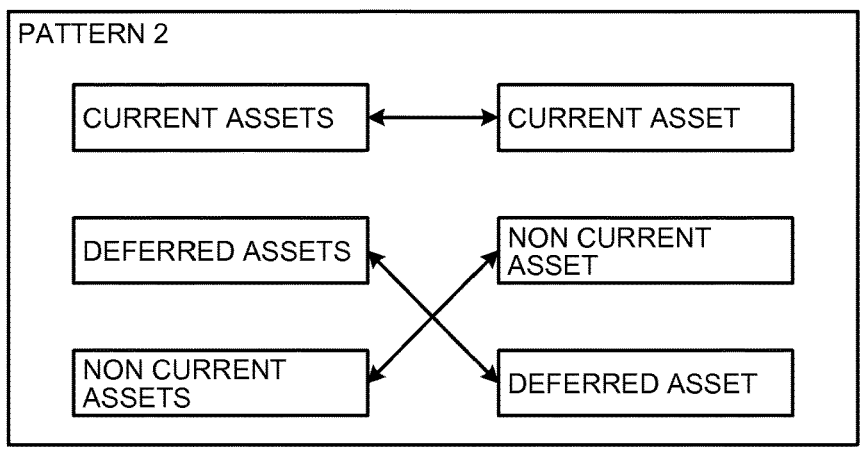
FIG. 8B is a diagram (2) of a pattern example of combinations between child items before and after the change.
Figure 8C:
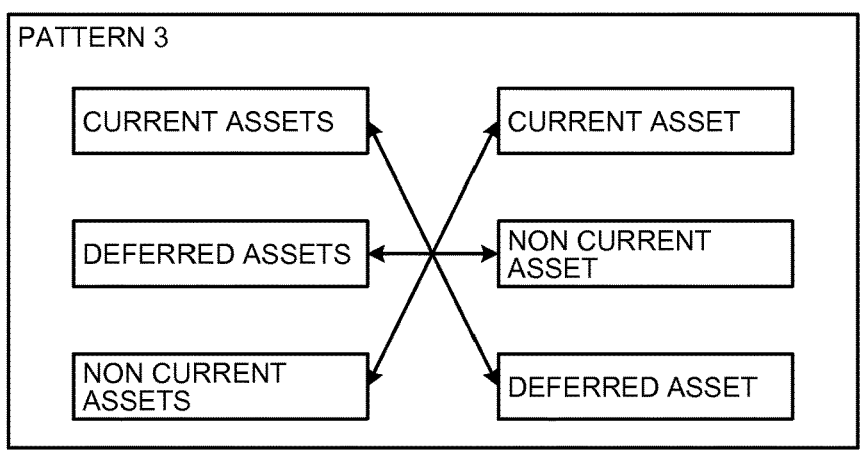
FIG. 8C is a diagram (3) of a pattern example of combinations between child items before and after the change.

Mapping of child items based on the tree structures before and after the change (comparison source/destination) will be explained herein with reference to FIG. 7 and FIG. 8A to FIG. 8C. FIG. 7 is a diagram of an example of tree structures before and after the change. FIG. 8A to FIG. 8C are diagrams of pattern examples of combinations between child items before and after the change. FIG. 7 depicts the tree of the comparison-source parent item and the tree of the mapped comparison-destination parent item. Three child items are described respectively in the comparison-source tree and in the comparison-destination tree. For example, a comparison-source item name "DeferrdAssets" is changed to a comparison-destination item name "DeferrdAsset" and the order information is also changed from 2 to 3.

In this case, the item mapping unit 322 creates a plurality of patterns of combinations between child items respectively included in the comparison-source tree and in the comparison-destination tree. For example, as illustrated in FIG. 8A, Pattern 1 includes a combination of a comparison source "CurrentAssets" and a comparison destination "CurrentAsset", a combination of a comparison source "DeferredAssets" and a comparison destination "NonCurrentAsset", and a combination of a comparison source "NonCurrentAssets" and a comparison destination "DeferredAsset". As illustrated in FIG. 8B, Pattern 2 includes a combination of the comparison source "CurrentAssets" and the comparison destination "CurrentAsset", a combination of the comparison source "DeferredAssets" and the comparison destination "DeferredAsset", and a combination of the comparison source "NonCurrentAssets" and the comparison destination "NonCurrentAsset". As illustrated in FIG. 8C, Pattern 3 includes a combination of the comparison source "CurrentAssets" and the comparison destination "DeferredAsset", a combination of the comparison source "DeferredAssets" and the comparison destination "NonCurrentAsset", and a combination of the comparison source "NonCurrentAssets" and the comparison destination "CurrentAsset".

The item mapping unit 322 calculates a matching rate between child items included in a pattern of each of the patterns 1 to 3 using the item names of the child items and using the auxiliary information such as the label names, the reference names, and the order information. The item mapping unit 322 calculates an average of the matching rates between all the child items included in the pattern to thereby calculate a matching rate of the entire tree in each of the patterns 1 to 3. The item mapping unit 322 then selects a pattern whose entire matching rate is the highest. It is assumed herein that the item mapping unit 322 can select Pattern 2. As a result, it is found that the child item name "CurrentAssets" is changed to "CurrentAsset", the child item name "DeferredAssets" is changed to "DeferredAsset", and the child item name "NonCurrentAssets" is changed to "NonCurrentAsset".

In this manner, the item mapping unit 322 can optimally map the child items before and after the change even if the item name of a child item or the display order of a child item is changed. That is, the item mapping unit 322 can optimally map items before and after the change even if a plurality of pieces of information among item names and auxiliary information related to the items are changed.

Specific Examples of Patterns Before and after Change and Matching Rates

Patterns of combinations between child items before and after the change and their matching rates will be further explained with reference to FIG. 9A and FIG. 9B. FIG. 9A and FIG. 9B are diagrams for explaining specific examples of the patterns of combinations between child items before and after the change and of their matching rates. FIG. 9A depicts a tree of a comparison-source parent item "Assets" and a tree of a mapped comparison-destination parent item "Asset". Three child items are described respectively in the comparison-source tree and in the comparison-destination tree. The order information as the auxiliary information is described in each of the child items. An item number corresponding to an item is assigned to each item for convenience of description. Hereinafter, a content in parentheses after an item name indicates an item number. A sign "'" is assigned to an item number of a comparison destination with respect to a comparison source.

As illustrated in FIG. 9A, a comparison-source item name "CurrentAssets" (2) is changed to a comparison-destination item name "CurrentAsset" (2'). A comparison-source item name "NonCurrentAssets" (3) is changed to a comparison-destination item name "NonCurrentAsset" (3'). A comparison-source item name "DeferrdAssets" (4) is changed to a comparison-destination item name "DeferrdAsset" (4').

As illustrated in FIG. 9B, the item mapping unit 322 creates a plurality of patterns of combinations between child items respectively included in the comparison-source tree and in the comparison-destination tree. In FIG. 9B, Pattern p1 includes a combination of the comparison source "CurrentAssets" (2) and the comparison destination "CurrentAsset" (2'), a combination of the comparison source "NonCurrentAssets" (3) and the comparison destination "NonCurrentAsset" (3'), and a combination of the comparison source "DeferrdAssets" (4) and the comparison destination "DeferrdAsset" (4'). The patterns will be explained below using only item numbers without each item name. Pattern p2 includes a combination of the comparison source 2 and the comparison destination 2', a combination of the comparison source 3 and the comparison destination 4', and a combination of the comparison source 4 and the comparison destination 3'. Pattern p3 includes a combination of the comparison source 2 and the comparison destination 3', a combination of the comparison source 3 and the comparison destination 2', and a combination of the comparison source 4 and the comparison destination 4'. Pattern p4 includes a combination of the comparison source 2 and the comparison destination 3', a combination of the comparison source 3 and the comparison destination 4', and a combination of the comparison source 4 and the comparison destination 2'. Pattern p5 includes a combination of the comparison source 2 and the comparison destination 4', a combination of the comparison source 3 and the comparison destination 2', and a combination of the comparison source 4 and the comparison destination 3'. Pattern p6 includes a combination of the comparison source 2 and the comparison destination 4', a combination of the comparison source 3 and the comparison destination 3', and a combination of the comparison source 4 and the comparison destination 2'.

The item mapping unit 322 calculates matching rates each between child items included in a pattern of each of the created Patterns p1 to p6. The matching rate between child items is calculated herein by using, in certain child items, a matching rate between item names of child items and a matching rate between pieces of order information as auxiliary information of the child items. Specifically, the matching rate between item names of child items in certain child items is calculated by Equation (1). The matching rate between pieces of order information of child items in certain child items is calculated by Equation (4). The matching rate between child items is calculated by Equation (5).

In FIG. 9B, a percentage following a combination of child items is a matching rate between the child items. Herein, for example, a matching rate between the child items in the combination of the comparison source 2 and the comparison destination 2' is 92.3%. A matching rate between the child items in the combination of the comparison source 3 and the comparison destination 3' is 93.80%. A matching rate between the child items in the combination of the comparison source 4 and the comparison destination 4' is 92.30%.

Furthermore, the item mapping unit 322 calculates an average of the matching rates each between child items included in a pattern, to thereby calculates a matching rate of an entire tree in each of the Patterns p1 to p6. Specifically, the matching rate of the entire tree in each pattern is calculated by Equation (6). Herein, for example, a matching rate of the entire tree in Pattern p1 is 92.80%. A matching rate of the entire tree in Pattern p2 is 55.80%. A matching rate of the entire tree in Pattern p3 is 78.80%. A matching rate of the entire tree in Pattern p4 is 48.40%. A matching rate of the entire tree in Pattern p5 is 50.30%. A matching rate of the entire tree in Pattern p6 is 56.90%.

The item mapping unit 322 then selects a pattern with a highest entire matching rate. Herein, the item mapping unit 322 selects Pattern p1 with a highest value of 92.80%. As a result, it is found that the child item name "CurrentAssets" (2) is changed to "CurrentAsset" (2'). It is found that the child item name "NonCurrentAssets" (3) is changed to "NonCurrentAsset" (3'). It is found that the child item name "DeferredAssets" (4) is changed to "DeferredAsset" (4').

One Example of Outputs

Figure 10:
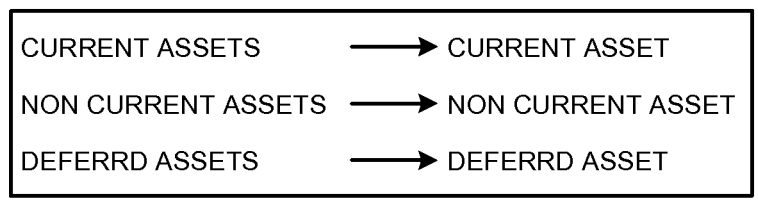
FIG. 10 is a diagram of an example of outputs by an output unit.

One example of outputs by the output unit 33 will be further explained with reference to FIG. 10. FIG. 10 is a diagram of an example of outputs by the output unit. In the example of FIG. 10, output examples in Pattern p1 selected in FIG. 9B are displayed.

Main Processing in Mapping Processing

Figure 11:
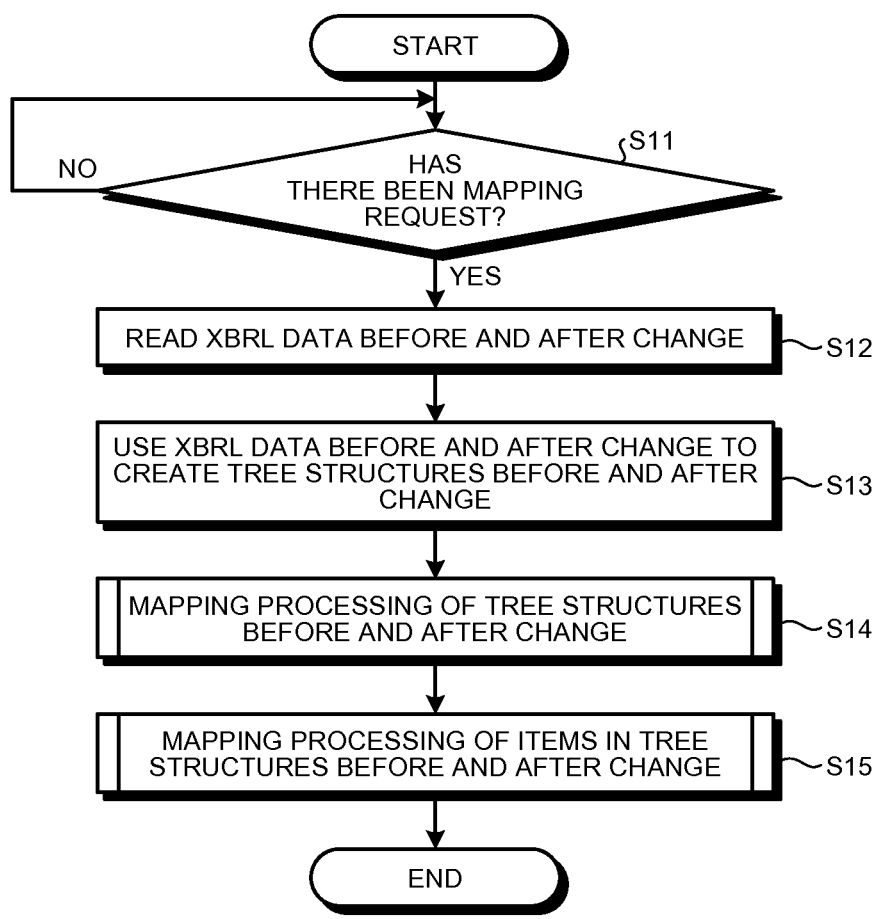
FIG. 11 is a flowchart of a main processing procedure in mapping processing according to the embodiment.

A main processing procedure in mapping processing according to the embodiment will be explained next with reference to FIG. 11. FIG. 11 is a flowchart of a main processing procedure in mapping processing according to the embodiment.

First of all, the control unit 3 determines whether there has been a mapping request (Step S11). When it is determined that there has been no mapping request (No at Step S11), the control unit 3 repeats the determination processing until a mapping request is received. Meanwhile, when it is determined that there has been a mapping request (Yes at Step S11), the structural analysis unit 31 reads the XBRL data 21 and 22 before and after the change from the storage unit 2 (Step S12). The structural analysis unit 31 may receive the XBRL data 21 and 22 before and after the change from the outside instead of reading them from the storage unit 2.

Then, the structural analysis unit 31 uses the XBRL data 21 and 22 before and after the change to perform structural analysis and create tree structures before and after the change (Step S13). For example, the structural analysis unit 31 creates a tree structure, related to items described in the schema 41 before the change, using the linkbase 42 before the change. The structural analysis unit 31 also creates a tree structure, related to items described in the schema 41 after the change, using the linkbase 42 after the change.

Subsequently, the tree-structure mapping unit 321 performs the mapping processing on the tree structures before and after the change (Step S14).

Thereafter, the item mapping unit 322 performs the mapping processing on the items in the tree structures before and after the change having been subjected to the mapping processing (Step S15). Then the main processing in the mapping processing is ended.

Mapping Processing of Tree Structures Before and After Change

Figure 12:
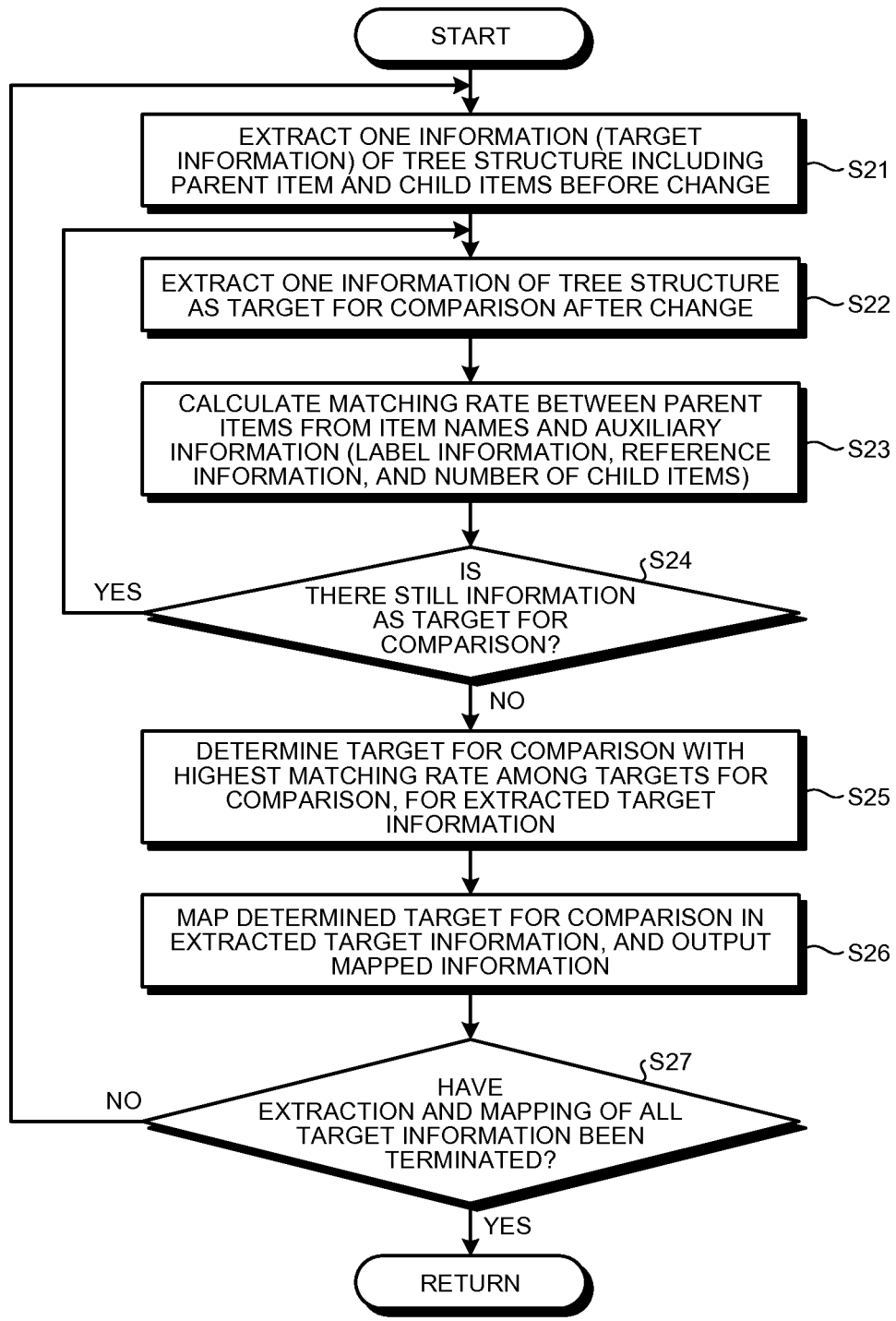
FIG. 12 is a flowchart of a mapping processing procedure of tree structures before and after the change.

The mapping processing procedure at Step S14 illustrated in FIG. 11 will be explained next with reference to FIG. 12. FIG. 12 is a flowchart of the mapping processing procedure of tree structures before and after the change. It is assumed that the tree-structure mapping unit 321 receives the tree structures before and after the change created by the structural analysis unit 31.

Then the tree-structure mapping unit 321 extracts one information (target information) of the tree structure including the parent item and the child items before the change (comparison source) (Step S21). The tree-structure mapping unit 321 then extracts one information of the tree structure as a target for comparison after the change (comparison destination) (Step S22).

Subsequently, the tree-structure mapping unit 321 calculates a matching rate between parent items from the item names of the parent items and the auxiliary information (Step S23). The auxiliary information includes label information, reference information, and the number of child items hanging from a parent item. For example, a matching rate between parent items is calculated using Equation (1) to Equation (3).

Then the tree-structure mapping unit 321 determines whether there is still information as a target for comparison (Step S24). When it is determined that there is still information as a target for comparison (Yes at Step S24), the tree-structure mapping unit 321 proceeds to Step S22 in order to extract information as next target for comparison.

Meanwhile, when it is determined that there is no information as a target for comparison (No at Step S24), the tree-structure mapping unit 321 determines a target for comparison with a highest matching rate (between parent items) among targets for comparison, for the extracted target information (Step S25).

Then, the tree-structure mapping unit 321 maps the determined target for comparison in the extracted target information, and outputs the mapped information (Step S26). In other words, the tree-structure mapping unit 321 maps the tree structure related to a parent item, as a target for comparison in which a matching rate of the target information with the parent item is the highest, in the tree structure of the target information related to the parent item. That is, the tree-structure mapping unit 321 maps the tree structures of parent items with a highest matching rate between the parent items, which are determined as the tree structures closest to each other in structure.

Subsequently, the tree-structure mapping unit 321 determines whether extraction and mapping of all the target information have been terminated (Step S27). When it is determined that extraction and mapping of all the target information have not been terminated (No at Step S27), the tree-structure mapping unit 321 proceeds to Step S21 in order to extract next target information.

Meanwhile, when it is determined that extraction and mapping of all the target information have been terminated (Yes at Step S27), the tree-structure mapping unit 321 ends the mapping processing of the tree structures.

Mapping Processing of Items in Tree Structures Before and After Change

Figure 13:
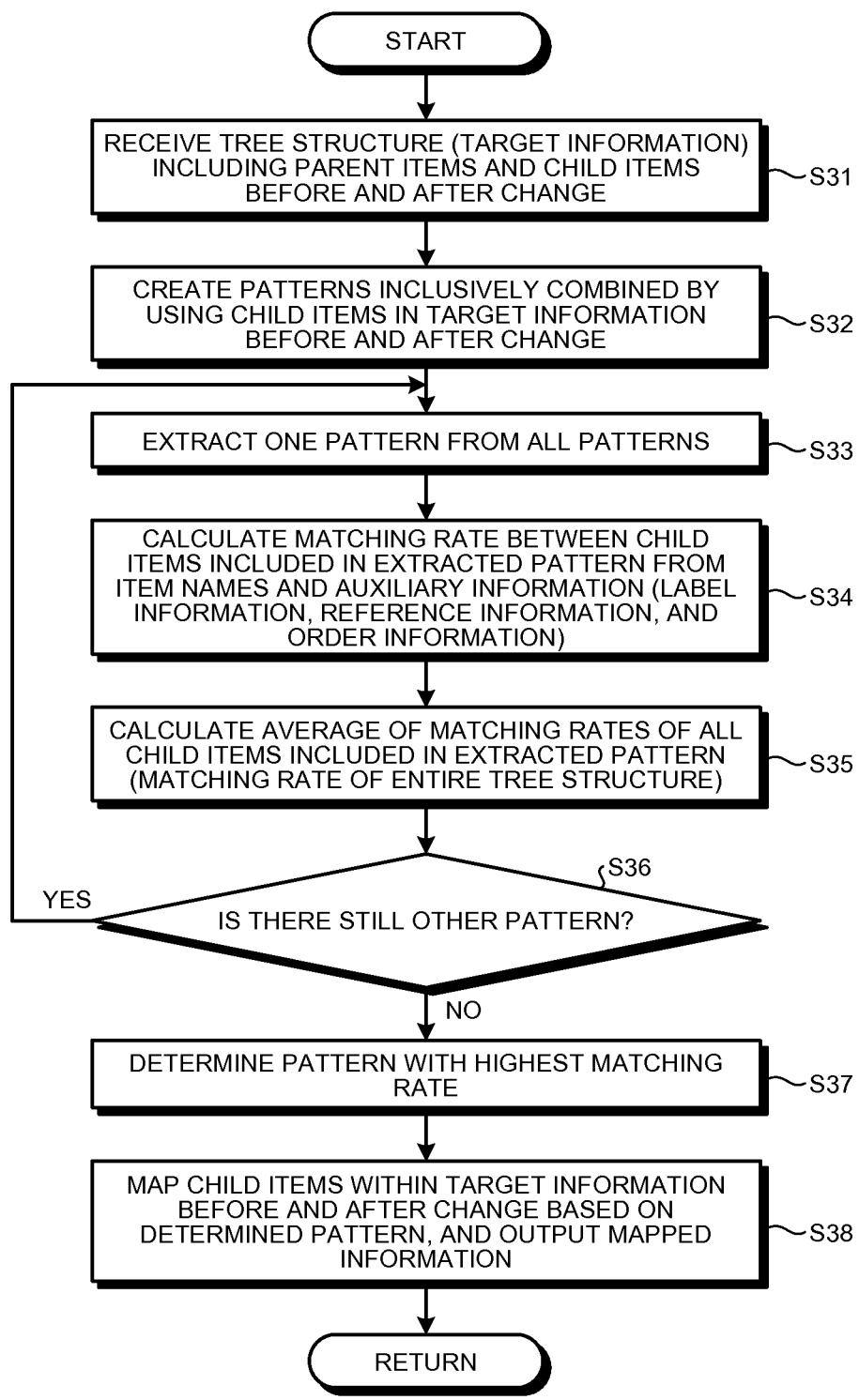
FIG. 13 is a flowchart of a mapping processing procedure of items in the tree structures before and after the change.

The mapping processing procedure at Step S15 illustrated in FIG. 11 will be explained next with reference to FIG. 13. FIG. 13 is a flowchart of the mapping processing procedure of items in the tree structures before and after the change. It is assumed that the item mapping unit 322 receives a set of tree structures before and after the change mapped by the tree-structure mapping unit 321.

Then the item mapping unit 322 receives one set of the tree structures before and after the change (target information) mapped by the tree-structure mapping unit 321 (Step S31). The tree structure includes a parent item and child items. The item mapping unit 322 then creates patterns inclusively combined by using the child items in the target information before and after the change (Step S32).

Subsequently, the item mapping unit 322 extracts one pattern from all the patterns (Step S33). The item mapping unit 322 then calculates a matching rate between child items included in the extracted pattern from the item names and the auxiliary information of the child items (Step S34). The auxiliary information includes label information, reference information, and order information. For example, a matching rate between child items is calculated by using Equation (1), Equation (4), and Equation (5).

Then the item mapping unit 322 calculates an average of matching rates of all the child items included in the extracted pattern (Step S35). The calculated result indicates a matching rate of an entire tree structure related to the extracted pattern. For example, a matching rate of an entire tree structure is calculated by Equation (6).

The item mapping unit 322 determines whether there is still other pattern (Step S36). When it is determined that there is still other pattern (Yes at Step S36), the item mapping unit 322 proceeds to Step S33 in order to extract a next pattern.

Meanwhile, when it is determined that there is no other pattern (No at Step S36), the item mapping unit 322 determines a pattern with a highest matching rate of the entire tree structure (Step S37). The item mapping unit 322 then maps the child items within the target information before and after the change based on the determined pattern, and outputs the mapped information (Step S38). In other words, the item mapping unit 322 maps the child items included in the pattern with the highest matching rate of the entire tree structure. The item mapping unit 322 then ends the mapping processing of the items in the tree structure.

Effects of Embodiment

According to the embodiment, the mapping device 1 calculates a matching rate between top-level parent items, in a parent-child relationship between items of the XBRL data 21 before the change and in a parent-child relationship between items of the XBRL data 22 after the change, using item information (e.g., item name and auxiliary information) related to the parent items. The mapping device 1 maps the parent items of the XBRL data 21 before the change and of the XBRL data 22 after the change based on the calculated matching rate between the parent items. According to the configuration, the mapping device 1 maps the parent items based on the matching rate between the parent items using the item information related to the parent items. Consequently, the mapping device 1 can optimally map a parent item in which a plurality of pieces of item information are changed and a parent item before the change by using a matching rate between the parent items using the item information for the mapping between the parent item in which the pieces of item information are changed and the parent item before the change.

According to the embodiment, the mapping device 1 calculates a matching rate between item names of parent items, and also calculates a matching rate between pieces of auxiliary information related to each parent item of the parent items. Then the mapping device 1 calculates an average of the calculated matching rates, to thereby calculate a matching rate between the parent items. According to the configuration, because the matching rate between the parent items is used for mapping of the parent items before and after the change, the mapping device 1 can optimally map the parent item in which a plurality of pieces of information are changed and the parent item before the change even if the item name of a parent item and the auxiliary information related to the parent item are changed.

According to the embodiment, the mapping device 1 calculates a matching rate between item names of parent items, a matching rate between pieces of auxiliary information related to each parent item of the parent items, and a matching rate between the numbers of child items hanging from each parent item of the parent items. The mapping device 1 calculates an average of the calculated matching rates and thereby calculates a matching rate between the parent items. According to the configuration, the mapping device 1 uses the matching rate between the parent items including the number of child items hanging from the parent item for mapping of the parent items before and after the change, even if a plurality of pieces of information related to the parent item are changed. Consequently, the mapping device 1 can optimally map the parent item in which the pieces of information are changed and the parent item before the change.

According to the embodiment, when the parent items are mapped, the mapping device 1 calculates matching rates between child items hanging from the mapped parent item of the XBRL data 21 before the change and from the mapped parent item of the XBRL data 22 after the change by using the item information related to the child items. Then the mapping device 1 maps the child items of the XBRL data 21 and the XBRL data 22 based on the calculated matching rates between the child items. According to the configuration, the mapping device 1 maps child items based on the matching rate between the child items using the item information related to the child items. Consequently, the mapping device 1 can optimally map child items whose pieces of item information are changed and a child item before the change by using the matching rate between the child items using the item information for mapping of the child items whose pieces of item information are changed and of the child item before the change. For example, the mapping device 1 can optimally map the changed child item and the child item before the change by using the matching rate between the child items including the item names and the display order even if the item names and the order information of the child items are changed.

According to the embodiment, the mapping device 1 creates a plurality of patterns of combinations between child items hanging from the mapped parent item of the XBRL data 21 before the change and from the mapped parent item of the XBRL data 22 after the change. The mapping device 1 then calculates a matching rate between the child items in each of the created patterns. Furthermore, the mapping device 1 maps the child items of the XBRL data 21 before the change and of the XBRL data 22 after the change based on the matching rate between the child items calculated for each pattern. According to the configuration, the mapping device 1 maps the child items based on the matching rate, between the child items using the item information related to the child items, calculated for each pattern of combinations between the child items. Therefore, the mapping device 1 can efficiently map the changed child item and the child item before the change.

Programs and the Like

The mapping device 1 can be implemented by mounting the functions such as the control unit 3 and the storage unit 2 on an information processing device such as known personal computer and work station.

The illustrated components of the mapping device 1 are not necessarily configured as physically illustrated ones. In other words, specific modes of how the components are distributed or integrated in the mapping device 1 are not limited to the illustrated ones, and the whole of or part of the components can be configured by functionally or physically distributing or integrating them in arbitrary units according to various loads, usages, and so on. For example, the tree-structure mapping unit 321 and the item mapping unit 322 may be integrated as one unit. On the other hand, the item mapping unit 322 may be distributed into a creating unit that creates a pattern of combinations between child items included in the comparison-source tree and in the comparison-destination tree, and into a mapping unit that maps the child items using the created pattern. The storage unit 2 storing the XBRL data 21 before the change and the XBRL data 22 after the change may be configured as an external device of the mapping device 1 so as to be connected to the mapping device 1 via a network.

Figure 14:
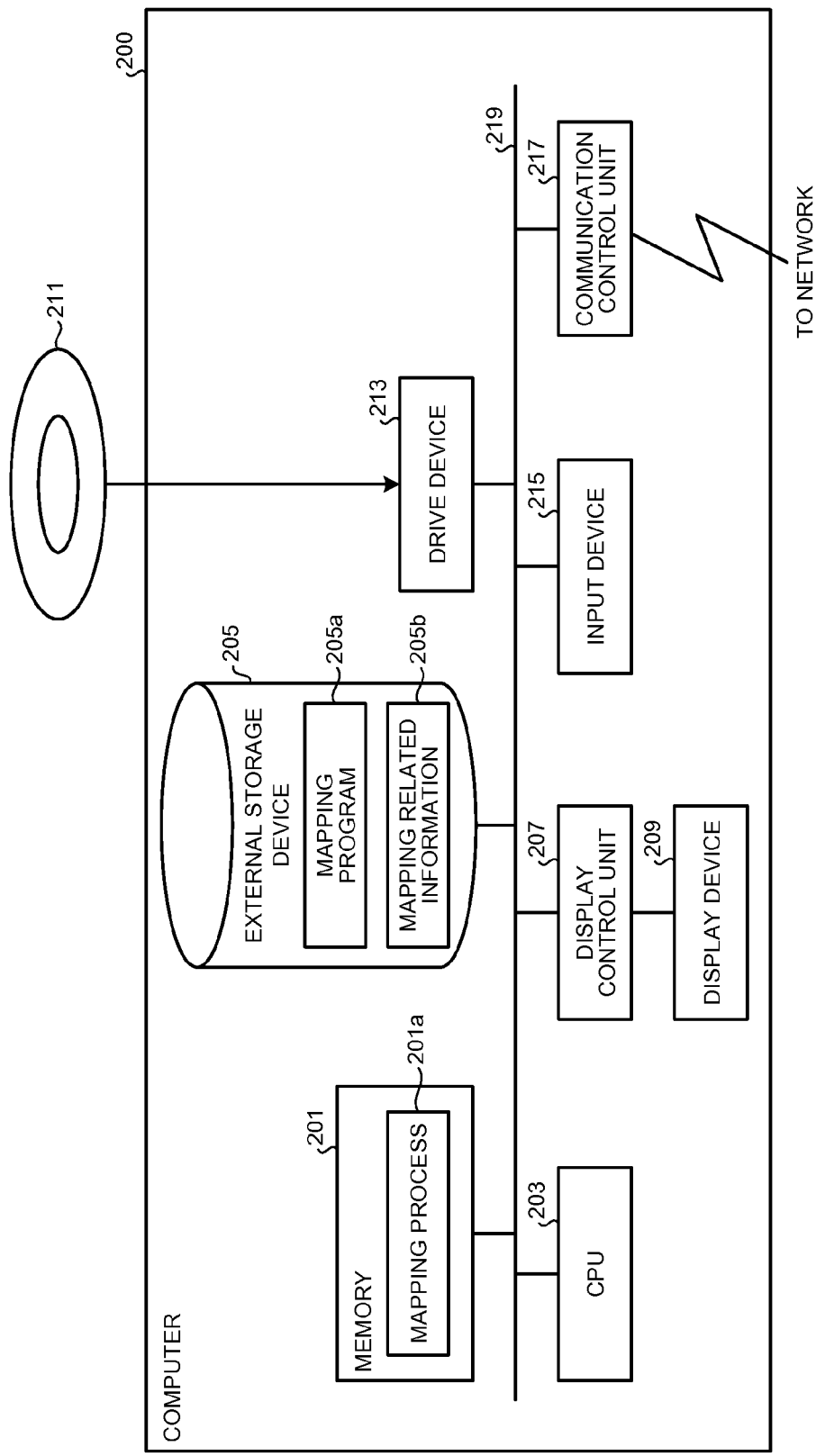
FIG. 14 is a diagram of an example of a computer that executes a mapping program.

The various types of processing explained in the embodiment can be implemented by a computer such as a personal computer or a work station executing previously prepared programs. Therefore, an example of a computer that executes a mapping program for implementing the same functions as these of the mapping device 1 illustrated in FIG. 1 will be explained below. FIG. 14 is a diagram of an example of a computer that executes a mapping program.

As illustrated in FIG. 14, a computer 200 includes a CPU 203 that executes various types of arithmetic processing, an input device 215 that receives an input of data from a user, and a display control unit 207 that controls a display device 209. The computer 200 also includes a drive device 213 that reads a program or the like from a storage medium and a communication control unit 217 that performs data transfer with other computer via the network. The computer 200 further includes a memory 201 that temporarily stores various pieces of information and an external storage device 205. The memory 201, the CPU 203, the external storage device 205, the display control unit 207, the drive device 213, the input device 215, and the communication control unit 217 are connected to each other through a bus 219.

The drive device 213 is a device for, for example, a removable disk 211. The external storage device 205 stores a mapping program 205a and mapping related information 205b.

The CPU 203 reads the mapping program 205a and loads it to the memory 201. The mapping program 205a functions as a mapping process 201a.

For example, the mapping process 201a corresponds to the function units of the control unit 3. The mapping related information 205b corresponds to the XBRL data 21 before the change and the XBRL data 22 after the change.

The mapping program 205a does not necessarily have to be stored in the external storage device 205 from the beginning. For example, the program is stored in a "portable physical medium" such as a flexible disk (FD), a CD-ROM, a DVD disc, a magneto-optical disc, or an IC card, which is inserted into the computer 200. Then the computer 200 may read the mapping program 205a from one of these mediums and execute it.

According to one aspect, even if a plurality of pieces of information related to items in XBRL data are changed, the items before and after the change can be associated with each other.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a mapping program that causes a computer to execute a process comprising:
    identifying a hierarchical structure of a first data before change and a hierarchical structure of a second data after change in which similarity of information associated with parent items which indicates items positioned in a same hierarchy of respective hierarchical structures meets criteria between a hierarchical structure between a plurality of items included in the first data including the plurality of items hierarchized and a hierarchical structure between a plurality of items included in the second data including the plurality of items hierarchized;
    creating a plurality of patterns obtained by combining child items with each other and calculating similarity between the child items included in each of the plurality of patterns for each of the created patterns by using information associated with the child items between a plurality of child items positioned below the parent items of the hierarchical structure of the identified first data and a plurality of child items positioned below the parent items of the hierarchical structure of the identified second data, by using a matching rate between the parent items using the item information for mapping between the parent item in which the pieces of item information are changed and the parent item before the change, so that a mapping device optimally maps the parent item in which a plurality of pieces of item information are changed and the parent item before the change;
    extracting a pattern with the highest similarity from among similarity between child items, which are respectively derived from the first data and the second data, calculated for each of the patterns; and
    associating the child items of the hierarchical structure of the first data and the hierarchical structure of the second data with each other based on the extracted pattern, wherein
    the parent item constitutes a tree structure of which a relationship is defined by a linkbase,
    the linkbase defining a relationship between items included in a schema, and
    the schema being a list of items used for an XBRL data and defining a name and a data type of each item.

2. The non-transitory computer-readable recording medium according to claim 1, wherein the process further includes first calculating a matching rate between parent items by calculating a matching rate between item names of the parent items and a matching rate between pieces of item information related to each parent item of the parent items and by calculating an average of the calculated matching rates.

3. The non-transitory computer-readable recording medium according to claim 2, wherein the first calculating includes calculating a matching rate between parent items by calculating a matching rate between item names of the parent items, a matching rate between pieces of item information related to each parent item of the parent items, and a matching rate between numbers of child items hanging from each parent item of the parent items and by calculating an average of the calculated matching rates.

4. The non-transitory computer-readable recording medium according to claim 3, wherein the process further includes second calculating, when parent items are associated with each other by the associating, a matching rate between child items respectively hanging from the associated parent item of the first data and from the associated parent item of the second data by using pieces of item information related to the child items and
    the associating includes associating the child items of the first data and of the second data with each other based on the calculated matching rate between the child items.

5. The non-transitory computer-readable recording medium according to claim 4, wherein the second calculating includes creating a plurality of patterns of combinations between child items respectively hanging from the associated parent item of the first data and from the associated parent item of the second data and calculating a matching rate between child items for each of the created patterns and
    the associating includes associating the child items of the first data and of the second data with each other based on the matching rate between the child items calculated for each of the patterns.

6. A mapping device comprising:
    a processor that executes a process including:
    identifying a hierarchical structure of a first data before change and a hierarchical structure of a second data after change in which similarity of information associated with parent items which indicates items positioned in a same hierarchy of respective hierarchical structures meets criteria between a hierarchical structure between a plurality of items included in the first data including the plurality of items hierarchized and a hierarchical structure between a plurality of items included in the second data including the plurality of items hierarchized;
    creating a plurality of patterns obtained by combining child items with each other and calculating similarity between the child items included in each of the plurality of patterns for each of the created patterns by using information associated with the child items between a plurality of child items positioned below the parent items of the hierarchical structure of the identified first data and a plurality of child items positioned below the parent items of the hierarchical structure of the identified second data, by using a matching rate between the parent items using the item information for mapping between the parent item in which the pieces of item information are changed and the parent item before the change, so that a mapping device optimally maps the parent item in which a plurality of pieces of item information are changed and the parent item before the change;

extracting a pattern with the highest similarity from among similarity between child items, which are respectively derived from the first data and the second data, calculated for each of the patterns; and associating the child items of the hierarchical structure of the first data and the hierarchical structure of the second data with each other based on the extracted pattern, wherein the parent item constitutes a tree structure of which a relationship is defined by a linkbase, the linkbase defining a relationship between items included in a schema, and the schema being a list of items used for an XBRL data and defining a name and a data type of each item.

7. A mapping method comprising:

identifying a hierarchical structure of a first data before change and a hierarchical structure of a second data after change in which similarity of information associated with parent items which indicates items positioned in a same hierarchy of respective hierarchical structures meets criteria between a hierarchical structure between a plurality of items included in the first data including the plurality of items hierarchized and a hierarchical structure between a plurality of items included in the second data including the plurality of items hierarchized by a processor;

creating a plurality of patterns obtained by combining child items with each other and calculating similarity between the child items included in each of the plurality of patterns for each of the created patterns by using information associated with the child items between a plurality of child items positioned below the parent items of the hierarchical structure of the identified first data and a plurality of child items positioned below the parent items of the hierarchical structure of the identified second data by the processor, by using a matching rate between the parent items using the item information for mapping between the parent item in which the pieces of item information are changed and the parent item before the change, so that a mapping device optimally maps the parent item in which a plurality of pieces of item information are changed and the parent item before the change;

extracting a pattern with the highest similarity from among similarity between child items, which are respectively derived from the first data and the second data, calculated for each of the patterns; and associating the child items of the hierarchical structure of the first data and the hierarchical structure of the second data with each other based on the extracted pattern, wherein the parent item constitutes a tree structure of which a relationship is defined by a linkbase, the linkbase defining a relationship between items included in a schema, and the schema being a list of items used for an XBRL data and defining a name and a data type of each item.

* * * * *